United States Patent [19]

Conee

[11] Patent Number: 4,606,524

[45] Date of Patent: * Aug. 19, 1986

[54] CAMERA SUPPORT CUSHION

[76] Inventor: Paul T. Conee, 99 N. Beacon St., Hartford, Conn. 06105

[ * ] Notice: The portion of the term of this patent subsequent to Feb. 26, 2002 has been disclaimed.

[21] Appl. No.: 506,408

[22] Filed: Jun. 21, 1983

Related U.S. Application Data

[63] Continuation-in-part of Ser. No. 422,858, Sep. 24, 1982, Pat. No. 4,501,401.

[51] Int. Cl.$^4$ ............................................. A47G 29/00
[52] U.S. Cl. ...................................... 248/346; 248/1; 354/293; D6/596
[58] Field of Search .......................... 248/102, 346, 1; 206/316; 150/52 J; 5/455, 442, 480, 449, 450; D6/596; 354/293, 294; 297/456

[56] References Cited

U.S. PATENT DOCUMENTS

| | | | |
|---|---|---|---|
| 1,778,545 | 10/1930 | Allen | 248/102 |
| 2,219,974 | 10/1940 | Bellow | 248/346 |
| 2,450,927 | 10/1948 | Allen | 248/102 |
| 2,589,303 | 3/1952 | Sourbeck | 5/442 |
| 2,806,131 | 9/1957 | Palmer | 248/1 |
| 2,956,287 | 10/1960 | Stanford | 248/1 |
| 3,216,681 | 11/1965 | Tagliavia | 248/346 |
| 3,411,164 | 11/1968 | Sumergrade | 5/442 |
| 3,767,094 | 10/1973 | Sikes | 248/346 |
| 3,863,882 | 2/1975 | Hatcher | 248/1 |
| 4,130,263 | 12/1978 | Roericht | 248/346 |
| 4,162,696 | 7/1979 | Sprung | 248/346 |
| 4,192,329 | 3/1980 | Swearingen | 248/1 |

FOREIGN PATENT DOCUMENTS

| 10419 | 9/1928 | Australia | 5/480 |
|---|---|---|---|

OTHER PUBLICATIONS

"McCall's 2159" *McCall's Needlework Patterns*, (Feb.–Mar. 1960).

*Primary Examiner*—J. Franklin Foss
*Assistant Examiner*—David L. Talbott

[57] ABSTRACT

A cushion is provided for supporting a camera in a multiplicity of stable positions upon a wide variety of support surfaces. The cushion will generally be constructed of a fabric-like material, and will have internal members that tie together opposing portions of the cushion, in some embodiments also dividing the internal space into a plurality of compartments. The internal space is filled with a free-flowing particulate solid material, thereby enabling the cushion to conform to the camera and to the surface upon which it is to be seated. Ideally, the cushion will have a "super elliptical" configuration, providing numerous stable positions and an ideal support surface for the camera, while minimizing the possibility of obstructing the view of the lens.

17 Claims, 10 Drawing Figures

CAMERA SUPPORT CUSHION

BACKGROUND OF THE INVENTION

This is a continuation-in-part of application for patent Ser. No. 422,858, filed Sept. 24, 1982, and now issued as Pat. No. 4,501,401.

It is, of course, common practice to utilize a tripod or like device for supporting a camera, thereby enabling extended exposures to be made, permitting automatic operation and, indeed, allowing the photographer to participate as a subject of the picture. Devices of this nature are, however, often cumbersome and unweildy, and often they cannot be set-up as quickly as might be desired.

As an alternative to a tripod, the camera may simply be steadied against any available stationary or steady structure; typically, a table or chair may be used indoors, and for outside photography a rock, a fence post, a tree, a building, or an automobile may, for example, conveniently be employed. Dependence upon such improvised support is often, however, less than satisfactory, because it may limit the range of positioning of the camera, and will not normally accommodate to, and therefore firmly hold, the camera; moreover, it is of course entirely possible that suitable structure may simply not be available when and where needed.

Sand-filled bags have been used for positioning and supporting cameras, but that practice is also undesirable for a number of reasons. Firstly, such bags tend to be heavy and difficult to transport. Secondly, they are not molded to the shape of the camera with facility, and finally, once having been set-up they tend to sag and to revert to a non-conforming condition.

Accordingly, it is a broad object of the present invention to provide a novel article for stably supporting a camera on virtually any stationary structure that has horizontal support features.

It is a more specific object of the invention to provide a novel supporting cushion for a camera, which cushion can readily be molded to accommodate the shape of the camera and will retain its conformation to ensure firm support for the lens.

Another object of the invention is to provide such a cushion, which offers a wide choice of positions for the camera, and thereby facilitates framing of the scene to be photographed, and which is so configured as to avoid interference with the view of the lens.

Yet another object of the invention is to provide such an article, which is light in weight, highly portable, and of relatively simple construction, which article is, in addition, quickly and easily situated and employed for use.

SUMMARY OF THE INVENTION

It has now been found that the foregoing and related objects of the invention are readily attained in a cushion comprised of a substantially matched pair of panels, preferably of rounded-rectangular configuration, joined to one another in spaced relationship by a peripheral wall extending thereabout. The panels and the peripheral wall cooperatively define a space within the cushion, and tying means is provided to tie together the panels and two opposite portions of the peripheral wall. A free-flowing filler material substantially completely fills the space within the cushion, and the panels and the peripheral wall are made of a relatively supple material to render it readily conformable to the camera. The tying means limits and localizes distortion caused by forces exerted upon the cushion, and thereby minimize buldging, sagging and loss of form.

In the preferred embodiments, the panel configuration is that of a "super ellipse", the peripheral curvature of which is based upon the equation $X^n/A^n + Y^n/B^n = 1$, wherein "n" has the value $2\frac{1}{2}$, "X" and "Y" represent Cartesian coordinates, and "A" and "B" are constants of appropriate value. Normally, the peripheral wall of the cushion will be of uniform width throughout its length, and the "opposite" portions of the peripheral wall will be on the longer sides of the cushion. Preferably, the tying means will comprise two sets of members, and most desirably at least one set will comprise a pair of webs, each such web being secured to the corresponding panel or wall portion and being joined adjacent its inner end to the other one of the pair. Usually, in such a case, both sets of tying means will comprise a pair of webs, with the webs of the two pairs being so configured as to not interfere with the free movement of one another. To achieve that, one of the sets may be configured to provide a central opening through which portions of the other can freely pass. More particularly, the "one" tying means may be of elongated configuration with lateral hump portions that project further inwardly than does a central portion forming an indentation therebetween. The indented portions of the elongated webs will therefore cooperate to provide the central opening when the corresponding hump portions are joined together.

The filler material used will generally comprise a mass of relatively light weight particles, normally of smoothly rounded shape and advantageously of a synthetic resinous material. The supple material from which the panels and peripheral wall of the cushion are fabricated should be porous, or it should be vented, to avoid any tendency for internal gas pressure to inhibit deformation; usually, a strong and durable fabric, of dark color and matte surface character, will be employed. A fabric material may also be used advantageously for internal tying web pieces.

DETAILED DESCRIPTION OF THE ILLUSTRATED EMBODIMENTS

Figure 1:
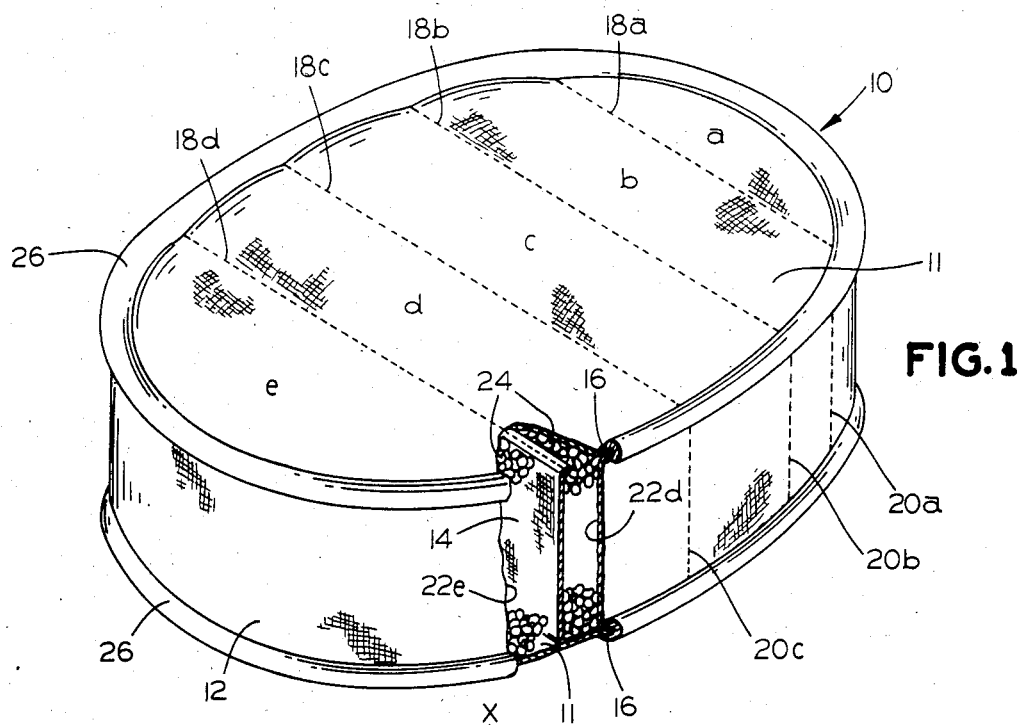
FIG. 1 is a perspective view of a camera support cushion embodying the present invention, with a portion broken away to illustrate internal features.
Figure 2:
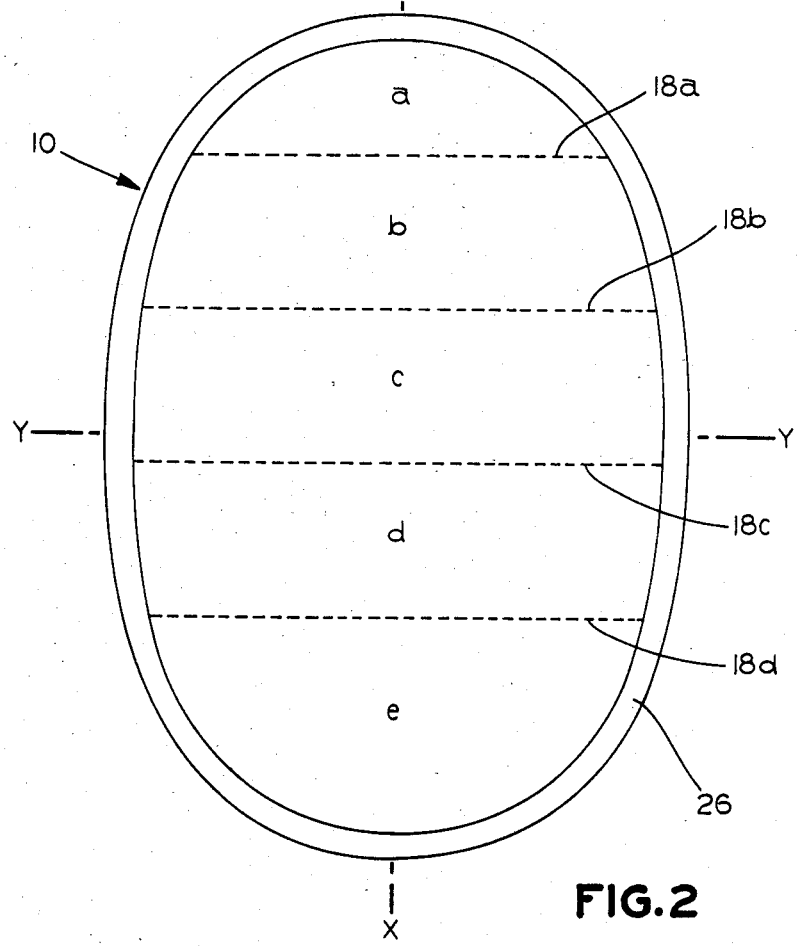
FIG. 2 is a plan view of the cushion of FIG. 1, showing its substantially "super elliptical" configuration.

Turning first in detail to FIGS. 1 and 2 of the drawings, therein illustrated is a cushion embodying the invention, generally designated by the numeral 10 and consisting of a pair of substantially identical outer panels 11 of "super elliptical" configuration, a peripheral sidewall strip 12 of uniform width extending thereabout, and four internal walls 14 (only one of which is visible). The foregoing are made of a supple and durable, all-weather fabric, and are joined by stitching along the seams 16, 18 $a$-$d$, and 20 $a$-$d$. The panels 11 and the sidewall strip 12 define an enclosed space, which is divided by the internal walls 14 into five compartments 22 $a$-$e$, only two of which (22 $d$ and $e$) are visible. The compartments 22 are, in turn, virtually completely filled with a free flowing filler material 24, such as may be provided by a mass of relatively light-weight plastic beads or particles. The cushion is finished by securing welting strips 26 over the peripheral seams 16, which may be done as part of the seaming operations.

As indicated by the locations of the seams 18, 20, the compartments 22b-22d are of substantially the same width (i.e., distance along the "X" axis in FIG. 2). The width at compartment $a$ is somewhat less than the other compartments, restricting deformation and preserving the elliptical contour, which configuration will well accommodate certain camera and lens combinations. The width of compartment $e$ is somewhat greater than the others, permitting more deformation or moldability of that section of the cushion, and thereby offering enhanced stability when the cushion is seated in an upright position thereupon.

As best seen in FIG. 2, the panels 11, and consequently the cushion itself (in cross section), are of "super elliptical" configuration, which is an idealized rounded-rectangular shape produced by a curve represented by the formular $X^n/A^n + Y^n/B^n = 1$, wherein "$n$" is an exponent of value $2\frac{1}{2}$, "X" and "Y" are Cartesian coordinates of the curve (taken from the X and Y axis shown in the Figure), and "A" and "B" are suitable constants. The resultant configuration integrates the constantly curved periphery of a circle with the major and minor dimensional features of a reactangle, and is especially beneficial in the instant cushion. Specifically, the rounded-rectangular shape enables support of the camera at different elevations, with the cushion resting either upon one of its longer or shorter edges, or lying flat upon one of the panel surfaces; the edge curvature permits support of the camera with its lens directed therealong, and since the surface curves away from the lens, obstruction is avoided. Piet Hein, the Danish mathematician and designer, has been credited with deriving the mathematical basis for the "super-ellipse".

Figure 3:
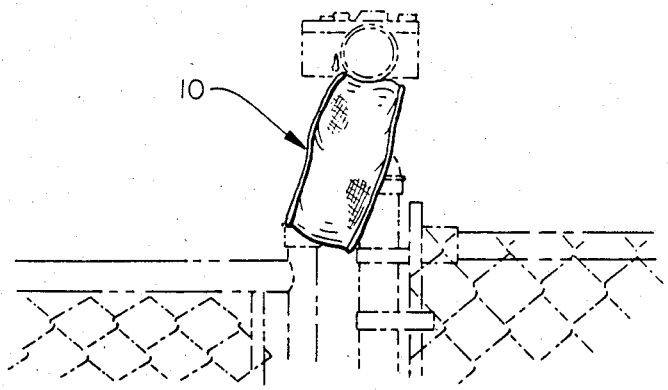
FIGS. 3–7 are elevational views illustrating the variety of positions in which the cushion of the invention can be used to support a camera upon various structures.
Figure 4:
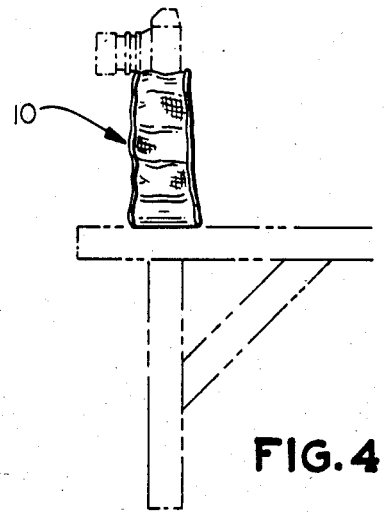

FIGS. 3-7 show several of the many ways in which the cushion of the invention can be used to support a camera. More particularly, FIG. 3 shows the cushion 10 disposed on edge and wedged between posts of a fence gate structure; the camera rests upon the upper edge of the cushion and is directed therealong. In FIG. 4, the cushion 10 is disposed on one of its shorter edges in an upright position, and is supported upon a bench; the camera lens is disposed in a direction transverse to (rather than aligned along) the edge.

Figure 5:
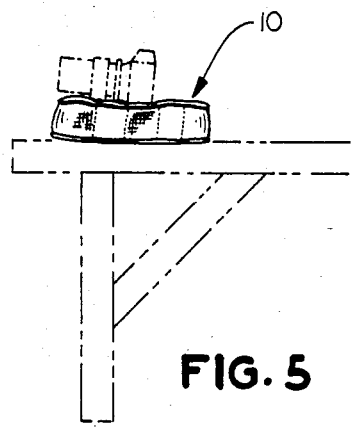
Figure 6:
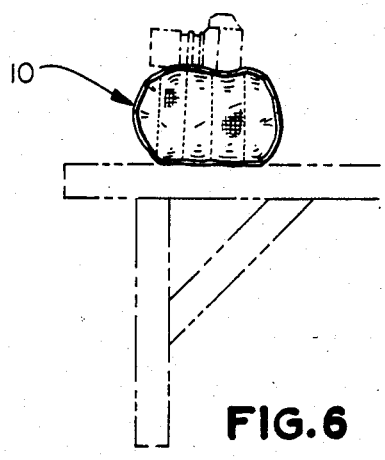
Figure 7:
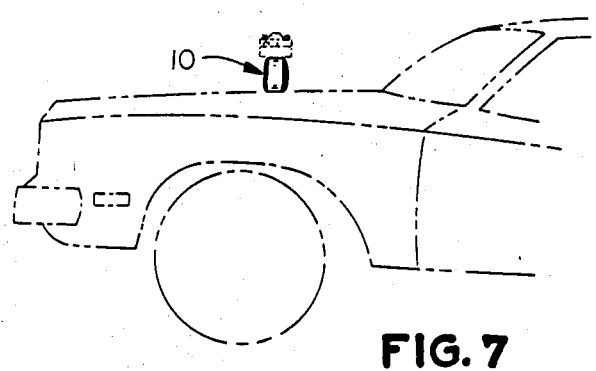

Maximum stability of support is achieved with the cushion lying directly upon one of its panels, and with the camera seated upon the opposite surface, as shown in FIG. 5. In FIG. 6, the cushion 10 is disposed on one or its longer edges, with the camera lens aligned along the opposite edge; this view perhaps best indicates the importance of the constant convature of the edge of the cushion in avoiding obstruction of the lens. FIG. 7 provides a further indication of the versatility of the cushion, showing it seated upon the hood of an automobile. If so desired, moreover, the cushion can be secured (such as by tying) to vertical and obliquely-disposed objects.

Figure 8:
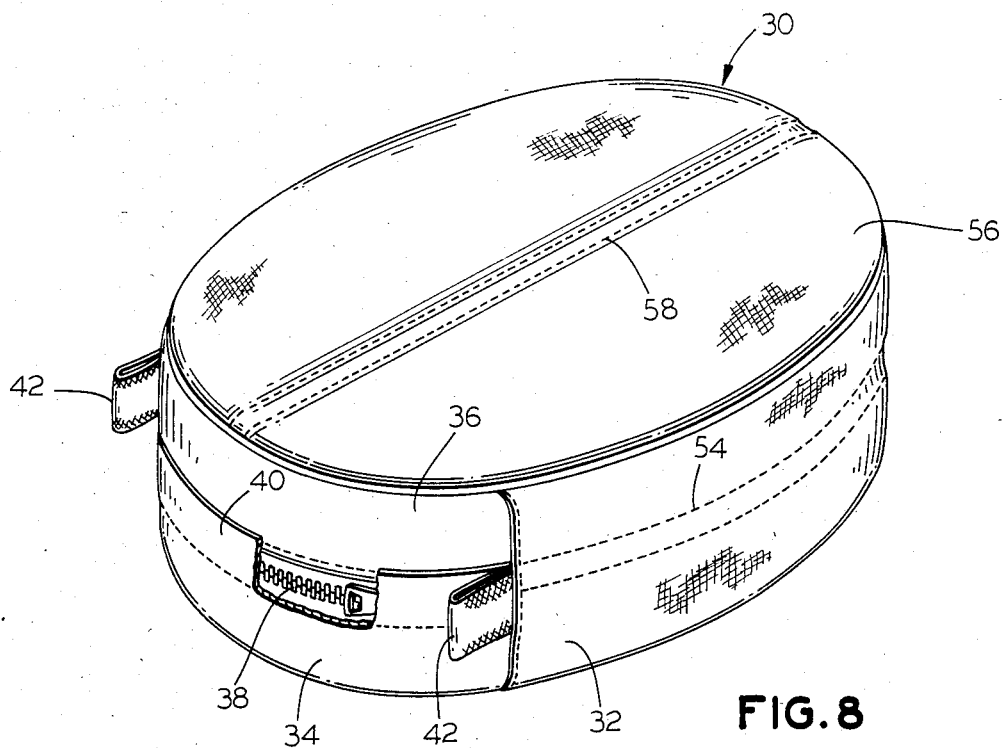
FIG. 8 is a perspective view of a second embodiment of the cushions of the invention, with a section of an end flap broken away to illustrate underlying features.
Figure 9:
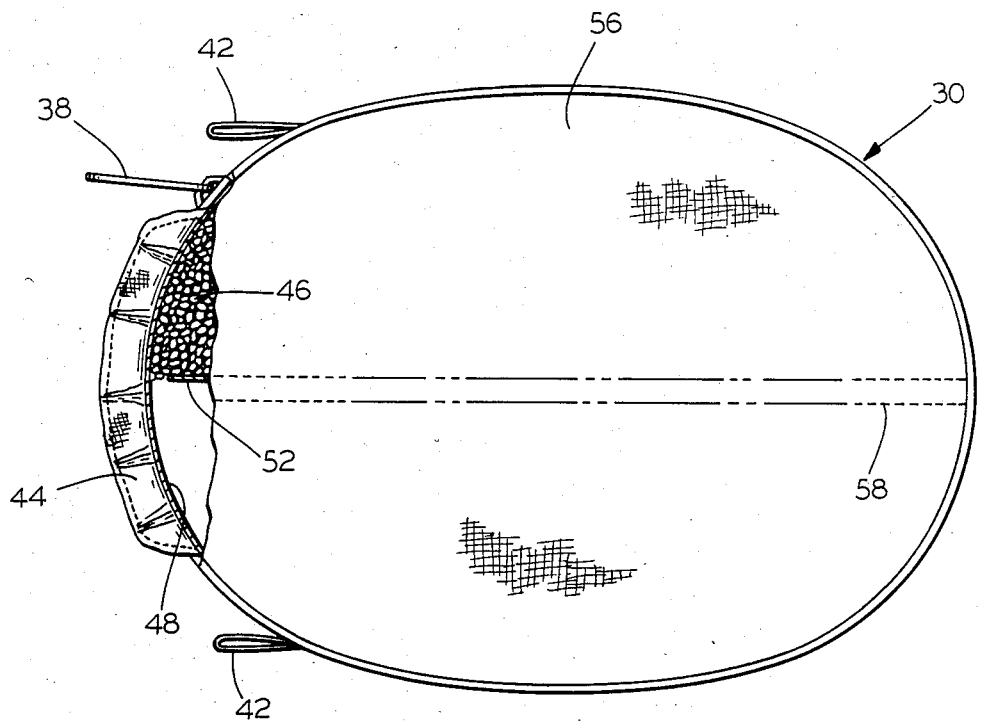
FIG. 9 is a plan view of the cushion of FIG. 8, with an end section broken away to show internal construction and the filling sleeve, a portion of the volume of filler material being omitted for clarity.
Figure 10:
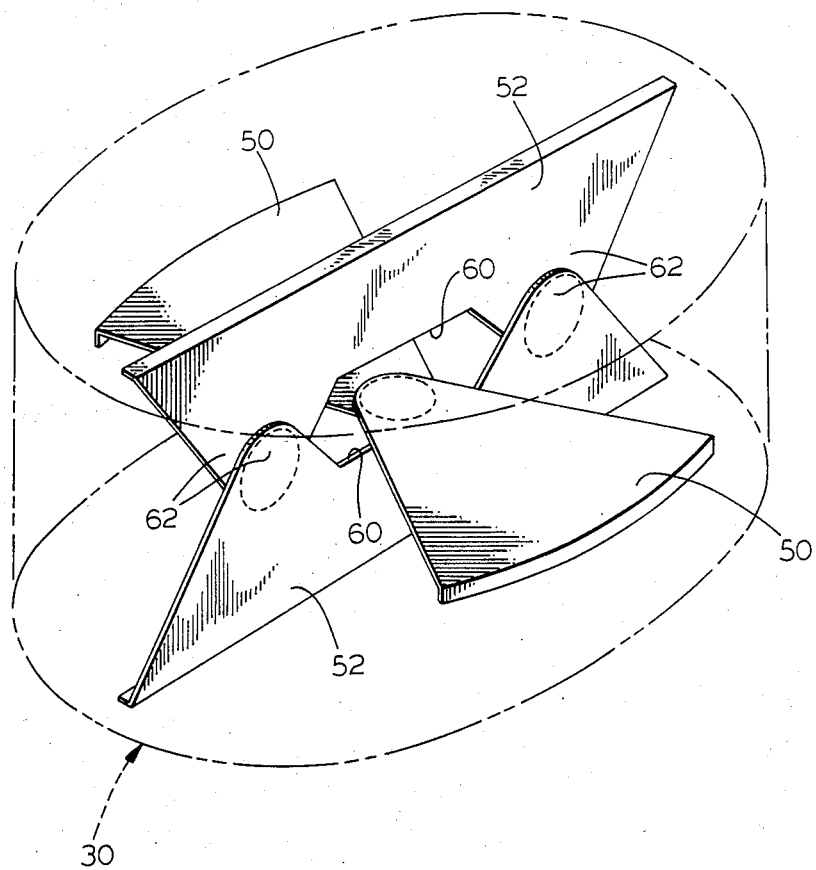
FIG. 10 is a perspective view showing the arrangement of the internal web pieces used as the tying means, the cushion shell being suggested in phantom line.

Turning now in detail to FIGS. 8-10 of the drawings, therein illustrated is a second embodiment of the invention, wherein the cushion, generally designated by the numeral 30, has the same super-elliptical configuration as the cushion 10, but an internal construction that is somewhat different.

In this form of the cushion, the peripheral wall consists of a strip 32, which extends about the major part of the cushion circumference, and a pair of end pieces 34, 36, which complete the wall and carry the parts of a zipper 38, the latter normally being hidden under the flap portion 40. A pair of fabric loops 42 are sewn into the structure at the seams between the peripheral wall strip 32 and the end pieces 34, 36; the loops provide means for carrying the cushion, such as by attaching to them a supplemental hand or neck strap. A fabric sleeve 44 is secured to the end pieces 34, 36 about the opening defined, to provide an extension by which the particulate filler 46 can readily be introduced into the space 48 within the cushion shell. As will be appreciated, after the filler material 46 has been introduced, the opposing portions of the sleeve 44 can be sewn shut; the sleeve can then be tucked into the body of the cushion, and maintained therewithin by closing the zippered opening.

Turning now in greater detail to FIG. 10, the internal tying means is most clearly illustrated therein, and consists of matched web pieces 50, 52. As can be seen, the generally triangular web pieces 50 are attached to the peripheral wall 32 by stitching 54 (FIG. 8), and the elongated, twin-hump pieces 52 are similarly secured to the panels 56 by stitching 58. The inner ends of the matching pieces 50 are sewn together, and they pass through the opening formed by the cooperating indentations 60 between the hump portions 62 of the web pieces 52, the corresponding hump portions 62 also being secured by sewing them to one another. As will readily be appreciated, the web pieces 50, 52 tie together the peripheral wall 32 and the panels 56, respectively, limiting outward extension while imposing little if any restraint upon inward displacement.

The primary advantage of the construction used for cushion 30, as compared to that of cushion 10, resides in ease of manufacture. Thus, by initially securing the web pieces 50, 52 to the peripheral wall strip 32 and the panels 56, and then joining them together in the final stages of production, the manufacturing operations are simplified considerably. The sleeve 44 also facilitates production, by providing means by which the filler material can be introduced with greater assurance and speed, and the use of a zipper closure adds further convenience.

Although, in the illustrated embodiment, the web pieces are sewn to one another to join their inner ends, other methods may be used and may, indeed, be more desirable. For example, hook-and-eye type fasteners can be employed for that purpose, as can snaps, "Velcro" fasteners, and the like, albeit with correspondingly diminished levels of permanancy.

Notwithstanding that the so-called "super ellipse" is regarded to be the ideal configuration for the cushion, it will be appreciated that other shapes can be employed. Preferably, the cushion will be longer in one direction than the other, and its edge will be curved so as to permit unobstructed support of the camera; i.e., it will be of rounded-rectangular configuration. The dimensions and relative proportions of the cushion can vary from those that are suggested by the drawings, and it may be desirable to manufacture it in a variety of sizes, so as to best adapt the cushion to a particular size or type of camera; it will readily be appreciated, however, that any cushion made in accordance with the present invention will be adapted for use with many different cameras. In this regard, it should also be understood that the device is not limited to use in connection with cameras, and that it may serve many other purposes; for example, the cushion may be utilized to stabilize gun sights, telescopes, and the like.

The internal walls and the tying web pieces are, as the case may be, of prime importance to the invention. They enable localized deformation to permit conformation of the cushion to the camera, without distortion of its overall form and without bulging, sagging or loss of control. These members effectively tie the other parts of the cushion (i.e., the panels and the peripheral strip) together; consequently force upon one section of the cushion will not unduly deform an adjacent section. While the number of such internal members used may deviate from the illustrations, the constructions shown appear to be optimal in cushions of practical size; such a cushion may, for example, measure from about 8 to 11 inches in length, 6 to 8 inches in width, and $2\frac{1}{2}$ to 3 inches in depth. The form and construction of the tying members may of course vary greatly from those shown, as will be evident to those skilled in the art.

The cushion will most desirably be made of a durable, all-weather fabric, which may be of a dark color and of a matte, or relatively rough, surface character, although color variation may enhance the aesthetic appeal of the article. Despite the preference for fabrics, it should be understood that supple plastic webs can also be employed in the construction of the cushion, provided that they exhibit the requisite characteristics, as described.

Generally, when fabrics are used to construct the cushion it will be most desirable, as a practical and aesthetic matter, to simply sew together the several component pieces. The free-flowing filler material can be introduced into the finished cushion shell through provided openings, which can subsequently be closed by appropriate means; alternatively, it can be introduced during production. The latter might best be accomplished by introducing the filler through seam openings which will ultimately be sewn shut, and the alternative use of a zipper closure has been described in connection with FIGS. 8–10.

The nature of the filler material may also vary considerably, as will be evident to those skilled in the art. It must of course be free flowing, and it should be relatively light in weight to maximize portability of the cushion. The preferred fillers will therefore normally be a particulate or bead-like thermoplastic resinous materials, which may, moreover, be foamed to minimize weight. Beads of polypropylene and like resins will typically be used, and the surfaces of the particles should be smooth and rounded to promote free movement within the cushion. While the filler material should substantially completely occupy the internal space, it will be evident that it should not be so fully packed as to inhibit adequate mobility, which would impose undue constraints upon conformability.

Thus, it can be seen that the present invention provides a novel article for supporting a camera on virtually any stationary structure that has horizontal support features. More specifically, a cushion is provided that can readily be molded to accommodate the shape of the camera, and that will retain its conformation to ensure firm support for the lens. It is light in weight, highly portable, and of relatively inexpensive and simple construction; it is, in addition, quickly and easily situated and emplaced for use, requiring virtually no set-up time or effort.

Having thus described the invention, what is claimed is:

1. A cushion for supporting a camera or the like, comprising: a substantially matched pair of panels joined to one another in spaced relationship by a peripheral wall extending thereabout, said panels and said peripheral wall cooperatively defining a space within said cushion; first means for tying together said panels said second means for tying together two opposite portions of said peripheral wall, said tying means extending between said panels and said wall portions respectively and limiting the outward movement thereof; and a free-flowing filler material contained within said cushion and substantially completely filling said space therewithin, said tying means being so configured as to avoid undue interference with the free flow of said filler material within said space, at least said panels and said peripheral wall being made of a relatively supple material to permit deformation of said cushion and conformation to the camera, said tying means limiting and localizing distortion caused by forces exerted upon said cushion, and minimizing bulging, sagging and loss of form.

2. The cushion of claim 1 wherein said panels are of rounded-rectangular configuration.

3. The cushion of claim 2 wherein said panel configuration is that of a "super ellipse", the peripheral curvature of which is based upon the equation $X^n/A^n + Y^n/B^n = 1$, wherein "n" has the value $2\frac{1}{2}$, "X" and "Y" represent Cartesian coordinates, and "A" and "B" are constants of appropriate value.

4. The cushion of claim 2 wherein said peripheral wall is of uniform width throughout its length, and wherein said opposite portions of said peripheral wall are on the longer sides of said cushion.

5. The cushion of claim 1 wherein each of said tying means comprises a set of members.

6. The cushion of claim 1 wherein at least one of said first and second tying means comprises a pair of webs, each such web being secured to the corresponding panel or wall portion, and being joined adjacent its inner end to the other web of said pair.

7. The cushion of claim 6 wherein both of said tying means comprise a pair of webs, the webs of said pairs being so configured as to not interfere with the free movement of one by the other.

8. The cushion of claim 7 wherein said webs of said one tying means are of elongated configuration, with lateral portions that project further inwardly than does a central portion lying therebetween, said central portions of said elongated webs cooperating to provide said central opening when the inner ends of the corresponding lateral portions thereof are joined together.

9. The cushion of claim 6 wherein one of said first and second tying means is configured to provide a central opening through which at least a portion of the other of said tying means can freely pass.

10. The cushion of claim 1 wherein said filler material comprises a mass of relatively light weight particles.

11. The cushion of claim 10 wherein said particles are of smoothly rounded shape, and are of a synthetic resinous material.

12. The cushion of claim 1 wherein said supple material is a strong and durable fabric, and wherein said tying means is also fabricated therefrom.

13. A cushion for supporting a camera or the like, comprising: a substantially matched pair of panels of rounded-rectangular configuration joined to one another in spaced relationship by a peripheral wall extending thereabout, said panels and said peripheral wall cooperatively defining a space within said cushion; first means for tying together said panels and second means for tying together two opposite portions of said peripheral wall, said tying means comprising pairs of interconnected webs secured to and extending between said panels and said wall portions, respectively, and limiting the outward movement thereof; and a free-flowing filler material contained within said cushion and substantially completely filling said space therewithin, at least said panels and said peripheral wall being made of a relatively supple material to permit deformation of said cushion and conformation to the camera, said tying means limiting and localizing distortion caused by forces exerted upon said cushion, and minimizing bulging, sagging and loss of form.

14. The cushion of claim 13 wherein said peripheral wall is of uniform width throughout its length, and wherein said opposite portions of said peripheral wall are on the longer sides of said cushion.

15. The cushion of claim 14 wherein said webs of said one tying means are of elongated configuration and have lateral portions that project furthe inwardly than does a central portion lying therebetween, said central portions of said elongated webs cooperating to provide said central opening when the corresponding lateral portions thereof are joined together.

16. The cushion of claim 13 wherein said supple material is a strong and durable fabric, and wherein said tying means is also fabricated therefrom.

17. In a cushion for supporting a camera or the like, the combination comprising: a substantially matched pair of rounded, corner-free panels joined to one another in spaced relationship by a peripheral wall extending thereabout, said panels and said peripheral wall cooperatively defining a space for the containment of a free-flowing filler material within the resultant shell; and means for tying together said panels and two opposite portions of said peripheral wall, said tying means extending between said panels and said wall portions and limiting the outward movement thereof, and being so configured as to avoid undue interference with the free flow of such filler material within said shell; at least said panels and said peripheral wall being made of a relatively supple material, to permit deformation of the cushion and conformation to the camera with the filler material confined within the shell, said tying means limiting and localizing distortion caused by forces exerted upon said cushion and transmitted by the filler material, to minimize bulging, sagging and loss of form.

* * * * *

UNITED STATES PATENT AND TRADEMARK OFFICE
CERTIFICATE OF CORRECTION

PATENT NO. : 4,606,524
DATED : August 19, 1986
INVENTOR(S) : Paul T. Conee

It is certified that error appears in the above—identified patent and that said Letters Patent is hereby corrected as shown below:

Column 6, line 21, "said" should be -- and --; line 39, "$X^n/A^{n-}$" should be -- $X^n/A^n$ --.

Column 8, line 29, "the" should be -- said --.

Signed and Sealed this

Seventeenth Day of March, 1987

Attest:

DONALD J. QUIGG

*Attesting Officer*  *Commissioner of Patents and Trademarks*